May 21, 1935.  J. I. GANTZ  2,002,175
FLUID PRESSURE DISPENSING MACHINE
Filed June 8, 1934
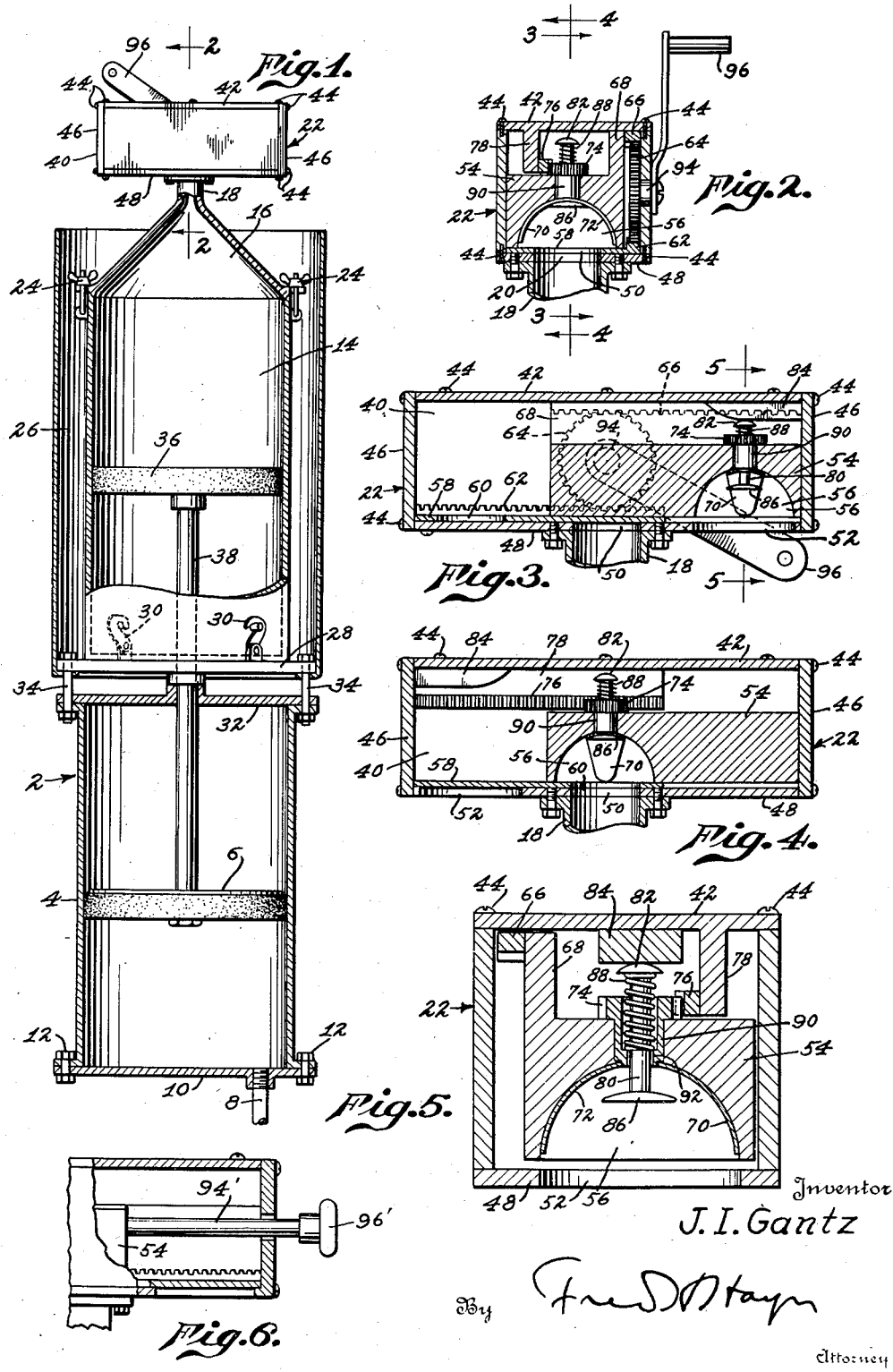
Inventor
J. I. Gantz Patented May 21, 1935

2,002,175

UNITED STATES PATENT OFFICE 2,002,175

FLUID PRESSURE DISPENSING MACHINE

Jack I. Gantz, Los Angeles, Calif.

Application June 8, 1934, Serial No. 729,599

8 Claims. (Cl. 107—8)

My invention relates to dispensing machines in which it is possible to dispense cleanly and efficiently a predetermined quantity or amount of any preferred material, such, for example, as ice cream, and more particularly to such machines as are actuated by fluid pressure, and preferably by a hydraulic power means, utilizing, if desired, the pressure of the city water mains.

It accordingly is an object of my invention to provide a novel form of preferably power actuated dispensing machine, which, if desired, may be equipped with a suitable power cylinder or means for placing the material to be dispensed under pressure so that said material will be conveyed to a measuring device, which may be equipped with suitable means for dispensing at will a predetermined amount or quantity of the material to be dispensed, efficiently and cleanly.

It is also an object of my invention to provide a novel form of measuring device including a suitable casing provided with a measuring member equipped with a measuring chamber, which chamber may be provided with a suitable wiper for facilitating the discharge of the material in said chamber to be dispensed, plural means, such as rack and pinion mechanism being provided for actuating said measuring member and said wiper, and, if desired, any preferred means, such as a cam being also provided in said casing as a knock out means for the measured material, any preferred means being also provided for actuating said plural means.

If desired, also, my novel form of measuring device may be equipped with a suitable vacuum breaking means to insure that the measured quantity or amount of dispensed material may be efficiently and cleanly dispensed.

The above, and further objects and advantages of my invention, as will hereinafter more fully appear, I attain by the construction described in the specification and illustrated on the drawing, forming a part of my application.

Reference is had to the accompanying drawing, in which similar reference characters denote similar parts. In the drawing, Fig. 1 is a part sectional and part elevational view of my invention, Fig. 2 is a somewhat enlarged cross-sectional view, taken on the line 2—2, Fig. 1, Fig. 3 is a similar view, taken on the line 3—3, Fig. 2, but illustrating the dispensing or measuring member in a different position than that disclosed in Fig. 2, Fig. 4 is a similar view, taken on the line 4—4, Fig. 2, Fig. 5 is a still further enlarged cross-sectional view, taken on the line 5—5, Fig. 3, and Fig. 6 is a fragmentary, cross-sectional detail view of a modified form of my invention.

Describing my invention more in detail, the reference numeral 2 indicates generally the dispensing machine, which may include a suitable power cylinder 4 in which is positioned the piston 6, which piston may be operated in any preferred way by a suitable fluid, but preferably by water, which may be that under pressure, such, for example, as the city water supply mains conveyed to the cylinder 4 by the pipe 8 to the cylinder head 10, associated in any preferred way with said cylinder, as by the nut and bolt assembly 12.

Preferably positioned above the power cylinder 4, although this is not essential, is a material container 14, adapted to house the material to be dispensed, which material may be ice cream. The container 14 may be of any preferred type and construction, but is preferably provided with a material discharge outlet means 16 having an outlet pipe 18 leading to the material inlet 20 of the measuring device 22, presently to be more particularly described.

If preferred, the material discharge or outlet means 16 may be detachably associated with the container 14 by any preferred means, such as the link and wing nut assembly 24.

As seen in Fig. 1, which discloses the machine for dispensing ice cream, the container 14 may have associated therewith any preferred form of refrigerating means 26, which may take the form of an ice jacket or box, preferably open at the top so that said container 14 and its top or discharge 16 may be surrounded by the refrigerating material, such as ice, or any other in practice suggested or desired.

The refrigerating means 26 may be equipped with a suitable bottom 28, to which, if desired, may be detachably secured the container 14 by any suitable means, such as the hook and pin assembly 30, and said bottom may also be detachably associated with the cylinder head 32 of the power cylinder 4 in any preferred way, as by the nut and bolt assembly 34. Of course, any other means for holding the various parts of my dispensing machine in secured and detachable relation may be used and still remain within the province of my invention.

To discharge the ice cream or the material to to be dispensed to the measuring device 22 under pressure, any suitable means may be provided, in the present instance a suitable piston 36 adapted to reciprocate in the container 14, said piston being preferably connected by the connecting rod 38 to the piston 6 in the power cylinder 4, so that as power is applied to said piston 6, as by the pressure of the water entering said cylinder 4 below said piston 6, pressure will be applied to the material above the piston 36 so that said material will be supplied to the inlet 20 of the measuring device 22 under pressure. I have found in practice that the pressure of the water in the city mains is ample to produce this result.

The measuring device 22 may comprise a suitable casing 40, constructed of any desired material, and of any preferred contour, said casing being equipped with a cover 42, preferably detachably associated with the casing 40 by any suitable means, such as the screw bolts 44, so that said casing may be opened and any needed repairs made. So also said casing may be equipped with end closures 46, also detachably associated with the casing by screw bolts 44.

The casing 40 may also be provided with a bottom 48, cut out as at 50 to provide an inlet means for the material conveyed thereto from the container 14, as previously described, and also with a discharge outlet 52 for discharging from the measuring device 22 the measured material, said discharge opening or outlet being preferably of larger size than the inlet 50 so that the measured material may be discharged cleanly.

Operable within the casing 40 is a suitable measuring member 54, provided with at least one material cavity or chamber 56, which chamber or cavity is adapted alternatively to align with the inlet opening 50 or the discharge outlet 52, Figs. 2 and 4 depicting said cavity or chamber in alignment with said inlet, to receive the material from the discharge 16 of the container 14, or as in Figs. 3 and 5 with the discharge outlet 52. The chamber or cavity 56 may be provided in the member 54 in any way in practice preferred.

So that an accurate amount of material be forced into the chamber 56, a suitable cut off 58 may be provided, which cut off is also provided with an inlet opening 60, adapted to align with the opening 50 when the material from the container 14 is forced into the chamber 56.

As will be apparent, the member 54 and the cut off 60, to function properly, should not only be simultaneously movable, but movable in opposite directions, so that as soon as the chamber is filled with the material to be dispensed, it should be cut off cleanly and efficiently. Any suitable means for accomplishing this may be provided.

For this purpose I may provide the cut off 60 with a rack bar 62, secured to said cut off or associated therewith in any way in practice preferred, the teeth of which are adapted to mesh with those of a pinion 64 (Fig. 3), the teeth of said pinion also meshing with a rack bar 66, associated as preferred with the extension 68 of the member 54, thus forming a double rack and pinion to provide for a simultaneous and opposite movement of the cut off 58 and the member 54.

To discharge the measured material cleanly and efficiently from the chamber or cavity 56, I may provide a wiper 70, which wiper has a curved portion 72, curved complementary to the curvature of the chamber 56 so that said wiper will detach the material from said chamber so it may be cleanly and efficiently discharged through the discharge opening 52.

The wiper 70 is preferably rotated, and said rotation is accomplished by any preferred means, such as the pinion 74 in mesh with a rack 76, associated in any preferred way with an extension 78 on the cover or closure 42. Hence, as the member 54 is moved, the pinion 74 thereon is rotated along the rack bar 76, and, of course, the wiper 70 is rotated therewith, said pinion 74, the pinion 64, member 54 and cut off 58 all forming a plural means which are simultaneously operated.

Since the material is forced into the chamber or cavity 56 under pressure, it is desirable that any vacuum conditions within the casing 40 be broken. Further, it is desirable that the removal of the dispensed material be efficiently accomplished. To this end, the wiper 70 may be provided with a stem 80 (Fig. 5, more particularly), which stem has a head 82 adapted to ride over a stationary cam 84, so said head, stem and knock out portion 86 may be depressed to knock out the material within the chamber 56, a spring 88, abutting the inner end of the head 82 and the inner end of the sleeve 90 of the pinion 74, opposing said knock out movement, which spring, after the material has been discharged, and the device 54 has been returned from its extreme amplitude of movement (Figs. 3 and 5), and said head 82 removed from the cam 84, said head, stem and knock out portion 86 will assume their original position, depicted in Figs. 2 and 4.

As seen more particularly in Fig. 5, a suitable clearance space 92 is provided about the stem 80, so that as soon as the piston 86 is depressed, any vacuum conditions within the casing 40 will be broken, and the material easily and cleanly dispensed through the discharge opening 52.

Any suitable means for operating the pinion 64 may be provided, Figs. 1, 2, and 3 showing a handy means in the shaft 94 and suitable crank handle 96, a simple turning movement of the handle 96 accomplishing the result, the rotary or oscillating movement of said handle being communicated to the pinion 64 by means of the shaft 94.

Should it be desired to dispense a larger or smaller amount or quantity of the material in the container 14, a set of measuring members 54 having chambers 56 of varying sizes to conform with said larger or smaller amount or quantity of the material to be dispensed, said member 54 being, of course, of identical size, and may easily be exchanged by removing the top or cover 42, which may be accomplished very quickly.

In Fig. 6 I have shown a modified form of such operating mechanism in which a reciprocating, rather than an oscillating or rotary movement being employed, which may be accomplished by any preferred lever or arm mechanism 94', connected to the member 54, and operable by a suitable knob 96', being used to move said member 54, the remaining parts of the mechanism being identical as those in the other form of my invention.

In accordance with the provisions of the patent statutes, I have described the principle of operation of my invention together with the machine and apparatus which I now consider to represent the best embodiment thereof; but I desire to have it understood that the apparatus and machine is only illustrative, and that the invention can be carried out by other means and ways.

I claim as my invention:

1. In a dispensing machine, a measuring device comprising a casing provided with a material inlet with means for supplying material thereto under pressure and a measured material discharge opening, a measuring member provided with a material measuring cavity mounted to reciprocate in said casing, cut-off means mounted to control said material inlet, and an operating means for moving said measuring member and said cut-off means in opposite directions simultaneously to move the cavity of the measuring member from alignment with the inlet to alignment with the discharge opening and simultaneously to move the cut-off means inward closing the material inlet.

2. In a dispensing machine, a measuring device comprising a casing provided with a material inlet and with a material discharge opening, a measuring member provided with a material measuring cavity mounted in said casing to reciprocate for bringing said cavity alternately into alignment with said inlet opening and with said discharge opening, a cut-off device and means for simultaneously reciprocating said cut-off device and said measuring member in opposite directions whereby the cut-off device closes the inlet opening as said cavity moves from alignment therewith and uncovering the discharge opening as said cavity comes into registration therewith.

3. A dispensing device as set forth in claim 2 having a knock-out plunger mounted to operate in said cavity with means for operating the same by the movement of said measuring member, said measuring member and said knock-out plunger providing an air passage around the plunger when the plunger is in its operative position to relieve vacuum in said cavity.

4. In a dispensing machine a measuring device comprising a casing equipped with an inlet connection and a discharge opening, with means for supplying material to said inlet connection, a measuring member mounted to reciprocate in said casing having a measuring cavity alternately aligned with said inlet connection and said discharge opening as the measuring member is reciprocated, cut-off means mounted to reciprocate independently of said measuring member and a rack and pinion device arranged to simultaneously actuate said measuring member and said cut-off means in opposite directions.

5. A measuring device as set forth in claim 4 having a knock-out device mounted in said measuring member arranged in cooperation therewith to relieve vacuum in said cavity as it is reciprocated to operative position and means for reciprocating said knock-out device by the movement of said measuring member.

6. In a dispensing machine, a mounting equipped with an inlet connection having means for supplying material thereto, a measuring member fitted to reciprocate on said mounting having a measuring cavity adapted to be alined with the said inlet connection, a rotary clearer and a reciprocating plunger both mounted in said measuring member to operate in said cavity and means for operating the same by the movement of said measuring member.

7. A measuring device as set forth in claim 6 wherein the rotary clearer and the reciprocating plunger are concentrically mounted and the reciprocating plunger has a rebated portion to relieve vacuum in said cavity as it is moving to operative position.

8. A measuring device as set forth in claim 6, having a rack and pinion device to rotate said clearer and a cam device to operate said plunger as the measuring member is reciprocated.

JACK I. GANTZ.